United States Patent
Koningstein et al.

(10) Patent No.: US 9,275,005 B2
(45) Date of Patent: Mar. 1, 2016

(54) DEVICE COMMISSIONING

(71) Applicant: Google Inc., Mountain View, CA (US)

(72) Inventors: Ross Koningstein, Atherton, CA (US); Paul Heninwolf, San Carlos, CA (US); James Charles Schmalzried, San Jose, CA (US); Girts Folkmanis, San Francisco, CA (US); Michael Sleator, Woodside, CA (US)

(73) Assignee: Google Inc., Mountain View, CA (US)

( * ) Notice: Subject to any disclaimer, the term of this patent is extended or adjusted under 35 U.S.C. 154(b) by 425 days.

(21) Appl. No.: 13/713,077

(22) Filed: Dec. 13, 2012

(65) Prior Publication Data

US 2014/0173059 A1    Jun. 19, 2014

(51) Int. Cl.
*G06F 15/177* (2006.01)
*H04L 12/24* (2006.01)

(52) U.S. Cl.
CPC ............ *G06F 15/177* (2013.01); *H04L 41/084* (2013.01); *H04L 41/0806* (2013.01)

(58) Field of Classification Search
None
See application file for complete search history.

(56) References Cited

U.S. PATENT DOCUMENTS

| | | | |
|---|---|---|---|
| 5,692,128 A * | 11/1997 | Bolles et al. | 709/224 |
| 7,188,161 B1 | 3/2007 | O'Neil et al. | |
| 7,962,130 B2 | 6/2011 | Moorer et al. | |
| 2005/0149626 A1 | 7/2005 | Manchester et al. | |
| 2006/0085632 A1 * | 4/2006 | Young et al. | 713/100 |
| 2006/0264227 A1 * | 11/2006 | Takahashi et al. | 455/513 |
| 2010/0262467 A1 | 10/2010 | Barnhill et al. | |
| 2011/0047370 A1 | 2/2011 | Nagel et al. | |
| 2014/0023336 A1 * | 1/2014 | Mast et al. | 386/200 |

FOREIGN PATENT DOCUMENTS

| | | |
|---|---|---|
| EP | 1553746 | 7/2005 |
| FR | 2895857 | 7/2007 |
| WO | 2010/049383 | 5/2010 |

OTHER PUBLICATIONS

ISR and Written Opinion dated Mar. 10, 2014, for PCT/US2013/073877.

(Continued)

*Primary Examiner* — Brian P Whipple
(74) *Attorney, Agent, or Firm* — Morris & Kamlay LLP (57) ABSTRACT

The disclosed subject matter may provide a system and methods for commissioning a device or appliance into a network. A processor may detect the insertion of a removable device into a data receptacle of a first device. The first device may be an appliance or a network controller. Information may be retrieved from or delivered to the removable device. The information may be information specific to the appliance, such as model number, or may be information related to the network controller. For example, information delivered from the network controller to the removable device may include a network address assignment and network protocol to be used by an appliance when the appliance communicates with the network. The removable device may be removed from the first device and inserted into a data receptacle of a second device.

39 Claims, 5 Drawing Sheets

(56) References Cited

OTHER PUBLICATIONS

The Cable Guy,"The New Wireless Network Setup Wizard in Windows XP Service Pack 2", Internet Citation, May 25, 2004, pp. 1-8, XP002319783, Retrieved from the Internet: URL:http://www.microsoft.com/technet/community/columns/cableguy/cg0804.mspx, [retrieved on Mar. 1, 2005] the whole document.

Yang, Jeonghwa et al.,"ICEbox: Toward Easy-to-Use Home Networking", Sep. 10, 2007, Human-Computer Interaction a Interact 2007; [Lecture Notes in Computer Science], Springer Berlin Heidelberg, Berlin, Heidelberg, p. 197-210.

* cited by examiner

| Step | Description | Number |
|---|---|---|
| | Detecting insertion of an inclusion key into a data receptacle of an appliance | 310 |
| | Retrieving information specific to a network from the inclusion key | 320 |
| | Identifying a network configuration parameter for the network | 330 |
| | Establishing a communication path between the appliance and a network controller | 340 |
| | Transmitting data identifying the appliance configuration to the network controller | 350 |
| | Commissioning the appliance into a network based on the identified appliance configuration | 360 |
| | Receiving an indication that the appliance has been commissioned into the network | 370 |

```
┌─────────────────────────────────┐
│ Detecting insertion of an       │
│ inclusion key into a data       │── 410
│ receptacle of an appliance      │
└─────────────────────────────────┘
              ↓
┌─────────────────────────────────┐
│ Retrieve information from the   │
│ inclusion key for commissioning │── 420
│ the appliance in a network      │
└─────────────────────────────────┘
              ↓
┌─────────────────────────────────┐
│ Establishing a communication    │
│ path between the appliance and  │── 430
│ the controller                  │
└─────────────────────────────────┘
              ↓
┌─────────────────────────────────┐
│ Transferring data identifying   │
│ the appliance configuration to  │── 440
│ the network controller          │
└─────────────────────────────────┘
              ↓
┌─────────────────────────────────┐
│ Commissioning the appliance     │
│ into a network based on the     │── 450
│ identified configuration        │
│ parameter                       │
└─────────────────────────────────┘
              ↓
┌─────────────────────────────────┐
│ Provide an indication that the  │
│ appliance has been successfully │── 460
│ commissioned into the network.  │
└─────────────────────────────────┘
```

FIG. 6

DEVICE COMMISSIONING

BACKGROUND

Networks can control various devices. Conventionally, each device that is connected to the network can receive and send data to the network controller. In order to send and receive the data, a network controller may need to identify each of the devices. Typically, a user enters the details of the device through a user interface into the network controller. The user also typically configures network settings for the device by providing or identifying a network address, and insures that the device and network use the proper network type and implementation. These items often require decisions by the end-user when installing a new, or uncommissioned, piece of equipment.

In addition, the user may also have to confirm that the latest software/firmware is installed on the device. For one or two devices, this is not too difficult of a task, but scale this to fifty or one hundred devices, and it becomes a daunting task both from a complexity and a time standpoint. Furthermore, the user must keep track of devices as they are removed or added to the network. For example, consider the case where the network was hardwired into a premises and the user was leaving the premises. It would take a considerable amount of time to remove each individual device from the network.

Furthermore, "older" equipment typically connects to central control using dedicated wiring, whether that is proprietary or standards based such as RS-485, RS-232 and the like. However, networking systems do not always have robust IP address management and network access management and are not receptive to changes over time. As a result, there can be a loss of communication with networked devices.

The above described problems may result in a lack of customer satisfaction in a networking system due to the difficulty in setting up the networking system as well as the system performance.

BRIEF SUMMARY

According to an implementation of the disclosed subject matter, a method is provided that facilitates commissioning of an appliance into a network. A network controller processor may detect the insertion of a removable device into a data receptacle of the controller. Information specific to the appliance may be retrieved from the removable device and may be used to identify a configuration parameter of the appliance. The configuration parameter may be used to commission the appliance in the network. Upon commissioning the appliance into the network, a communication path may be established between the appliance and a network controller to exchange network settings. The removable device may be removed from the controller data receptacle and inserted into a data receptacle of the appliance.

An implementation of the disclosed subject matter may provide a method using a pre-installed information used for commissioning an appliance into a network. The pre-installed information may be stored on an inclusion device. The pre-installed information may be used to identify the appliance to the network and be used to establish communication with the network. A processor may detect insertion of the inclusion device into an appliance data receptacle and may retrieve the pre-installed information from the inclusion device. A communication path between the appliance and a network controller may be established using the pre-installed information, and the appliance may transmit appliance configuration data to the network controller. In response, an indication may be output when the appliance is commissioned in the network using the data identifying the application configuration. The appliance may transmit application program interface data to the network controller.

An implementation of the disclosed subject matter may provide a method using an appliance-related inclusion device provided by an appliance manufacturer to commission the appliance into the network. The appliance-related inclusion device may be inserted into a data receptacle coupled to a network. Network configuration information related to the appliance may be transferred from the inclusion device. The appliance may be commissioned into the network using the configuration information. A user interface may indicate that the appliance has been successfully configured into the network.

An implementation of the disclosed subject matter may be a method that utilizes an un-keyed inclusion device to commission an appliance into a network. The un-keyed inclusion device may be inserted into a network controller of a network. The un-keyed inclusion device may be unrelated to any network or any device presently commissioned in the network. Network configuration parameters reserved for an appliance to be commissioned in the network may be transferred to the inclusion device. An indicator may indicate that the reserved configuration parameters have been transferred to the inclusion device memory.

An implementation of the disclosed subject matter may be a system that utilizes an inclusion device to commission an appliance into a network. The system may include an inclusion key docking station having a plurality of receptacles for accepting inclusion key as well as a network connection, a RF transceiver, and a network controller processor. Information specific to an appliance may be read from the removable inclusion key. A configuration parameter of the appliance may be identified. Using the read information, the appliance may be commissioned into the network, and a communication path between the appliance and network controller may be established to provide network settings to the appliance. A power line modem may be communicatively coupled to the processor. The communication path may be over a power line connected to the appliance.

Additional features, advantages, and implementations of the disclosed subject matter may be set forth or apparent from consideration of the following detailed description, drawings, and claims. Moreover, it is to be understood that both the foregoing summary and the following detailed description include examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

The following describes an expeditious and efficient method and system to setup and maintain dedicated device commissioning with a home controller/network that addresses the difficulties of installation and operation over time. An advantage of the disclosed subject matter is to provide simple and efficient installation of new appliances, such as televisions, thermostats, and the like by a user. In addition, equipment of different vintages and manufacturers may work together. Advantageously, the system may also be robust to the addition and removal of equipment and appliances from the network as well as home network components such as the network address translation (NAT) router or the home controller unit.

Figure 1:
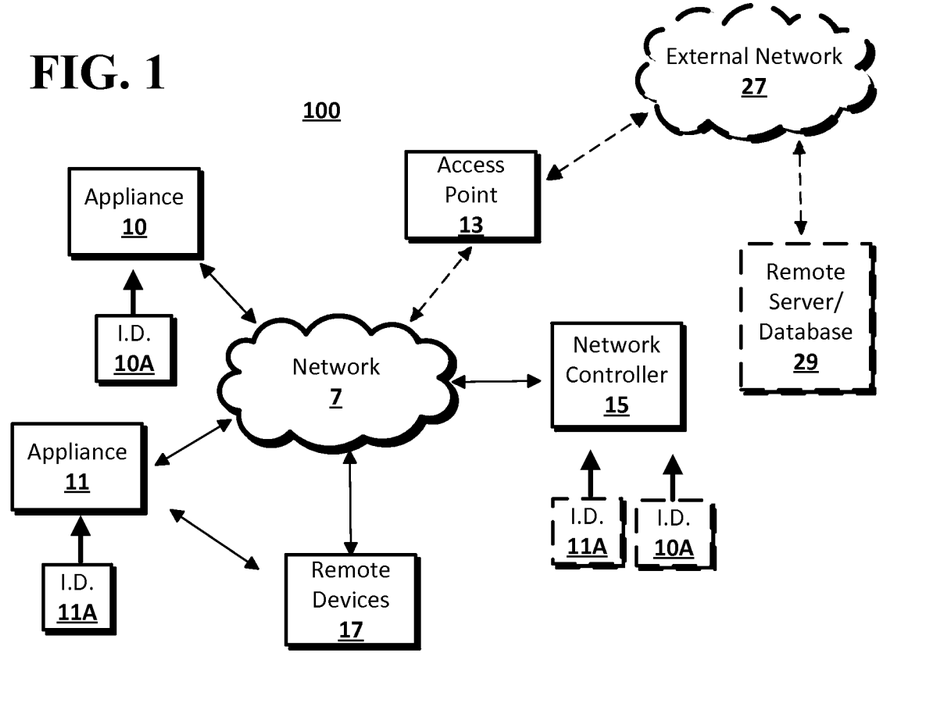
FIG. 1 shows a network configuration according to an implementation of the disclosed subject matter.

FIG. 1 shows an example network arrangement according to an implementation of the disclosed subject matter. An appliance 10, 11, such as a television, sprinkler system and the like, may have a data receptacle for receiving an inclusion key device (I.D.) 10A, 11A. The inclusion key device 10A, 11A may be provided by the appliance provider. The appliance provider may be a manufacturer, distributor, end-point seller/reseller, or a service organization that provides appliance components, such as the inclusion key. The inclusion key device 10A, 11A may be a small device that is connectable to a home network controller or an inclusion key docking station via a data receptacle such as an USB receptacle, an Ethernet jack or other suitable connector. The inclusion key device 10A, 11A may be similar to a Flash drive memory device, or an RF transceiver device used with wireless input devices. The inclusion key docking station may be a network accessible device that has several data receptacles, such as USB or Ethernet ports, into which the inclusion key device 10A, 11A can be connected. The inclusion key docking station may be connected to or incorporated into the network controller 15. An inclusion key device 10A, 11A may include information such as security information, addressing information, a network name, device identifier, addressing method (for example, DHCP, static IP, node ID, and the like), an encryption method, an encryption initialization vector, an user personal identification number, such as a PIN, and other information related to the appliance. Note that the information may be general information related to the appliance such as the model number, for example, model number XKLR, or may be specific to the specific appliance, such as an appliance serial number and the PIN of the user's model XKLR.

The automation network 7 may be managed by the home controller computer 15. For example, a user may choose and possibly install a network (Wi-Fi, Z-wave, Zigbee, PLC, and the like) 7. The user may have to further set a network name, network identification, addressing method (DHCP, static IP, node ID and the like), set an encryption method or an encryption initialization vector, and install optional encryption software, if not installed. In addition, optional configuration may be needed such as the installation of a radio, a demodulator (e.g. PLC), or wiring for custom/proprietary links. The home network controller 15 may be a personal computer, laptop or a dedicated computer system, which may be used to manage appliance 10, 11 and other devices in the system 100. The home controller computer 15 may either be connected to the network 7 or may be another device that is network accessible, such as access point 13. A home controller computer 15 may include a processor, a power line modem, and an inclusion key docking station having a plurality of receptacles for accepting inclusion key devices, a network connection, and a Wi-Fi transceiver. The home controller may also have the capability to access external data storage via the internet to obtain updates of any firmware or software in the appliance. The inclusion key device 10A, 11A may allow the appliance to be easily and securely commissioned or included into the network.

Figure 2:
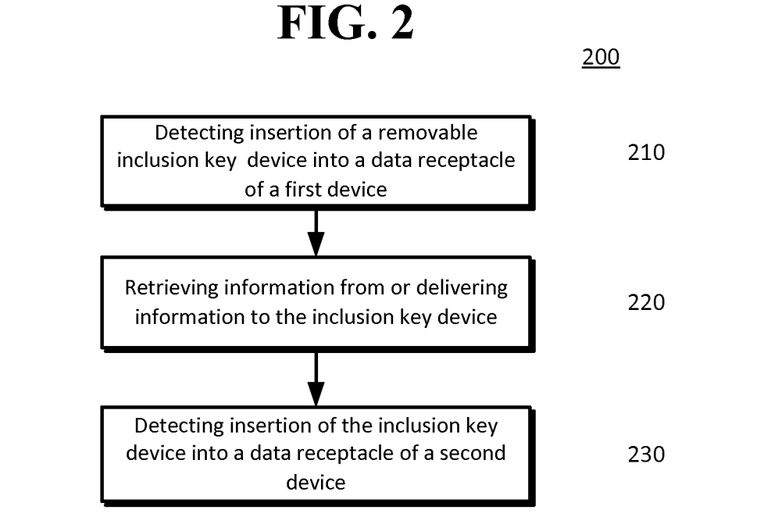
FIG. 2 shows a general process flowchart according to an implementation of the disclosed subject matter.

One or more appliances 10, 11, may communicate with remote devices 17, such as local computers, smart phones, tablet computing devices, and the like, which may connect to other devices via one or more networks 7. The remote devices 17 may either be wired or wireless devices. The network 7 may be a local network, wide-area network, or any other suitable communication network or networks suitable for a residence or business. The network 7 may, optionally, allow for a direct connection to an access point 13 to an external network 27, such as the internet, WAN, MAN or the like. The appliances 10, 11 may communicate with one or more servers and/or databases 29. The remote devices 17 may access the appliances 10, 11 via a communication path through the network 7. The appliances 10, 11 also may access an external network through the access point 13 for services provided by remote servers/databases 29 such as cloud computing arrangements and services. The remote server 29 may include one or more servers and/or databases. The access point 13 may include an RF frequency transceiver, a cable modem, a power line communication modem, and/or the like. The RF frequency transceiver may transmit signals compliant with, for example, IEEE 802.11-compliant standards (Wi-Fi), as well as Zigbee, Z-wave, X-10 or other communication protocols. Implementations for using the inclusion key device 10A, 11A may follow a general process. FIG. 2 shows a general process according to an implementation of the presently disclosed subject matter. A first device may be either an appliance or a network controller. For example, an appliance 10, such as a television, that is network accessible may include an inclusion key device 10A, and may be the first device. Information may be retrieved from or delivered to the removable inclusion key device. The information may be information specific to the appliance or may be information related to the network controller. For example, the appliance-specific information may be a model name, software/firmware version number, networking protocol capabilities, and the like. In the process 200, for example, information delivered from the network controller to the removable device may include a network address assignment and network protocol to be used by an appliance when the appliance communicates with the network.

The user may turn the power ON to the appliance, remove the inclusion key from the appliance, and insert the inclusion key into a home network controller data receptacle or an inclusion key docking station accessible by the home network controller. At 210, a processor in the home network controller may detect the insertion of a removable device into the data receptacle or the inclusion key docking station. The processor may read the data on the inclusion device at 220, and make the appropriate network settings based on appliance-specific data to commission the device into the network. The user may remove the inclusion device from the home controller upon completion of the commissioning process. The inclusion device may be returned to a data receptacle of the appliance. A processor in the appliance may detect the insertion of the removable device in the appliance data receptacle (230). Of course, at step 210, the first device may be a network controller, and the insertion of the inclusion key device may be detected by the network controller. In that case at step 230, the second device may be an appliance, and the insertion of the removable inclusion key device may detected by the appliance processor. In a secure implementation, the inclusion device remains communicatively coupled to the home network controller, for example, to allow continued authentication of the data being transferred from the network to the appliance and vice versa. The following describes processes according to implementations of the disclosed subject matter in more detail.

Figure 3:
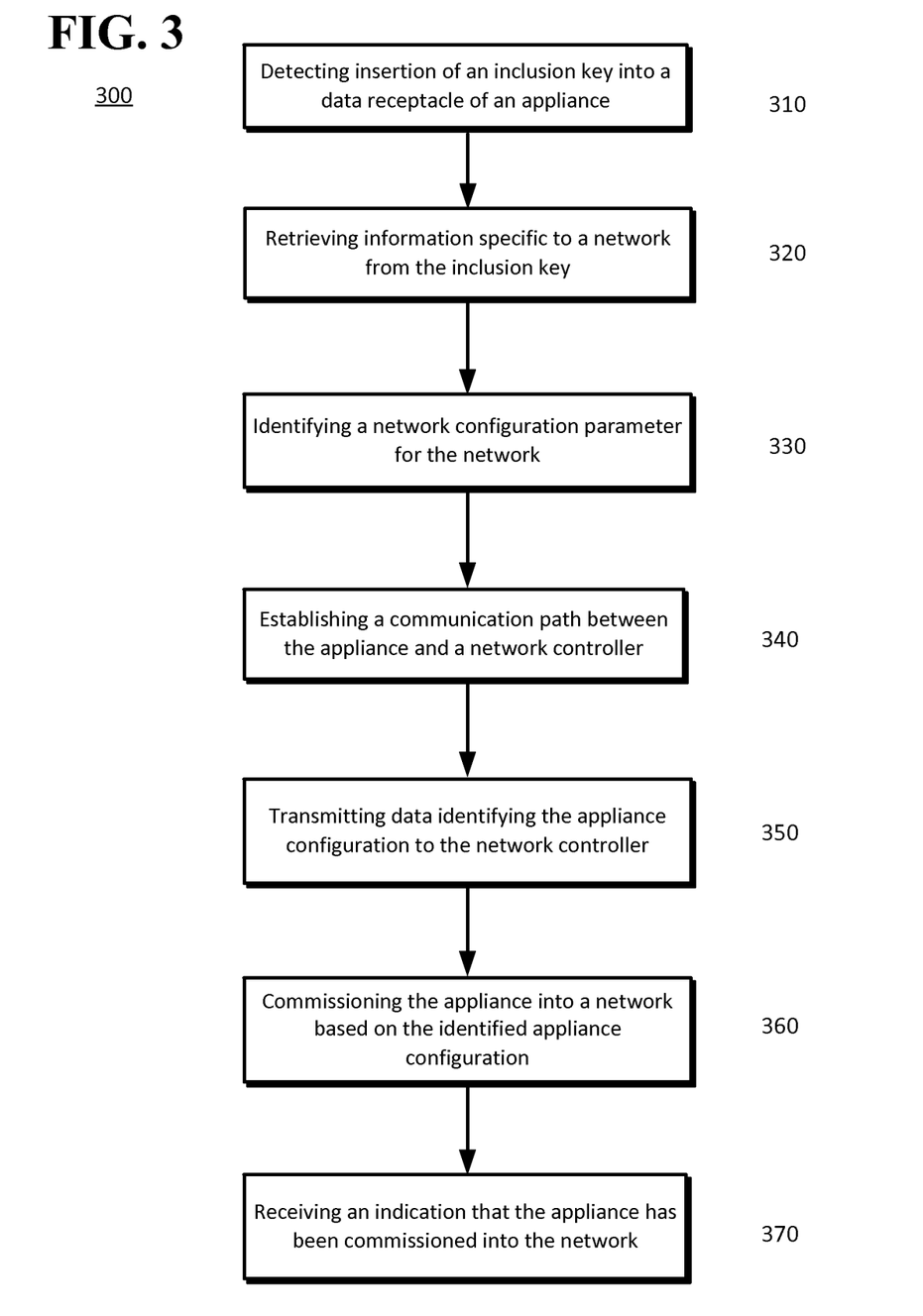
FIG. 3 shows a flowchart according to an implementation of the disclosed subject matter.

FIG. 3 illustrates a process 300 for commissioning an appliance into a network. An appliance may be provided with an inclusion key. The inclusion key may store data related to the appliance, such as the network type, an appliance password, encryption setting and the like. The appliance-related data may be pre-installed on the inclusion key by the appliance manufacturer or some other entity. The appliance may or may not be powered ON. The network controller may detect insertion of the appliance inclusion key device into a data receptacle of the network controller (310). The network controller may retrieve information specific to the appliance from the stored on the inclusion device (320) and may identify an appliance configuration parameter in the retrieved data (330). The appliance may be determined to be a new appliance that has not been previously commissioned in the network, or, in other words, an uncommissioned appliance. The configuration parameter may be selected from at least one of the appliance identification number, a network type, a network implementation, settings for the appliance, a device IP address, and a communication protocol of the appliance. For example, using the retrieved information and without user intervention, the home controller may, for example, set at least one of the network type (e.g., TCP/IP), the network implementation (e.g., Wi-Fi), the television-native LAN name (e.g., SONY-SN874578286267343), a password (e.g., 7823423FE2234), the television MAC address, the television IP address (e.g., 192.168.0.100), and a configuration URL such as configURL=setup/, and an encryption setting, which may be a default setting, in the television. Using the appliance configuration data, the appliance may be commissioned in the network using the data identifying the appliance configuration (340).

A communication path may be established between the appliance and a network controller (350). Continuing with the example, the controller may use a Wi-Fi link via an access point to connect to the television using network name (SONY™-SN874578286267343), with password (7823423FE2234), and access the TV configuration URL at 192.168.0.100/setup/. The communication path may alternatively be, for example, a wired communication path such as Ethernet or power line, or a wireless communication path, such as X-10 or the like. The network controller may provide network settings to the appliance.

In response to the commissioning, the appliance or the inclusion key may receive an indication that the appliance has been commissioned in the network. The network controller may also access an application program interface for the appliance from the removable inclusion key device. The application program interface may facilitate the exchange of data between the controller and the appliance. For example, the appliance may provide state information via the application program interface to the network controller. The appliance state information may include at least ON/OFF state, start time of an operation; maintenance reminders, end time of a present operation, volume level, brightness level, input source and current output state. The network controller may detect removal of the removable device from the controller data receptacle. The network controller may be configured to respond to the detected removal of the removable device by decommissioning the appliance from the network. Alternatively, a user may have to provide an input to the network controller to indicate that a device is to be decommissioned.

Alternatively, the network controller may determine that the removable device has been inserted into a data receptacle in the appliance, and may exchange additional data with the appliance via the communication path.

In addition, the appliance may be identified as a universal appliance based on the pre-installed information. For example, the pre-installed information may include an encryption key that allows a universal communication channel to be established between the appliance, the network and a remote control device, such as a smart phone. The universal communication channel may be a secure channel accessible by the remote control device, which may be a smart phone. The universal communication channel may allow the remote control device to transmit control signals to the appliance as well as receive status and state signals from the appliance. The control and status signals may be provided and presented in a similar manner as on network controller user interface.

The smart phone may execute an application that interacts directly with the appliance in a similar manner as the network controller. The smart phone may maintain the ability to control the appliance even when the smart phone is not present at the home. The remotely located smart phone may communicate with the network controller, which may forward commands to the appliance, or may continue to directly communicate with the appliance through a network access point via, for example, the internet and Wi-Fi, as shown in FIG. 1.

Figure 4:
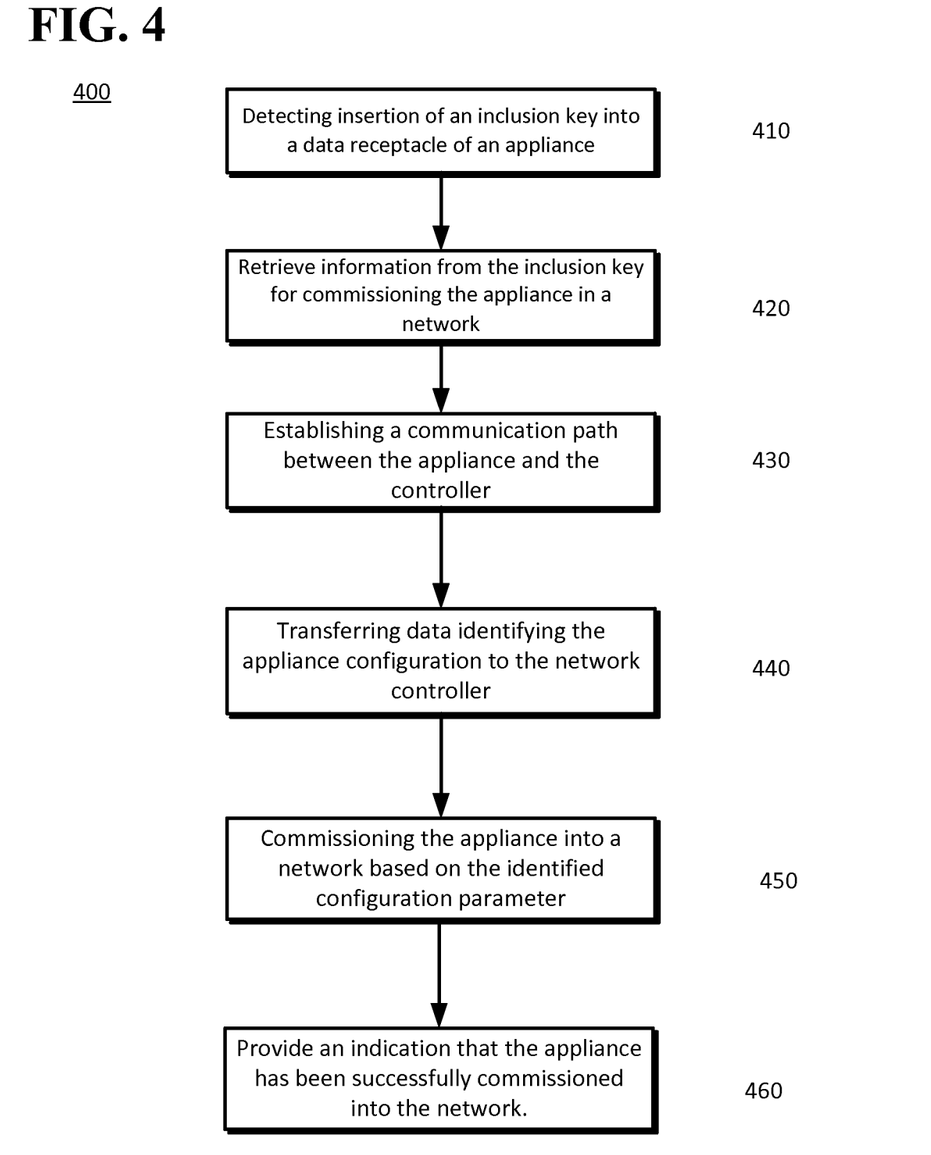
FIG. 4 shows a flowchart according to an implementation of the disclosed subject matter.

FIG. 4 illustrates a process 400 for commissioning an appliance into a network. A home network may be provided with an inclusion key. The inclusion key may store pre-installed data related to the network, such as the network name, a network encryption key and/or a network password. The network-related data may be pre-installed on the inclusion key by the network controller manufacturer or some other entity. A processor associated with the appliance may detect insertion of an inclusion key device into an appliance data receptacle (410). The appliance processor may retrieve the pre-installed information from the inclusion device (420). The pre-installed information may be a network password, a network name, security codes, an encryption key and the like. Using the pre-installed information, a communication path may be established between the appliance and a network controller (430). The communication path may be, for example, a wired communication path such as Ethernet or a power line, or a wireless communication path, such as an 802.11-compliant data link or the like. Data identifying the appliance configuration may be transmitted to the network controller, for example, over the communication path (440). Using the appliance configuration data, the appliance may be commissioned in the network using the data identifying the application configuration (450). In response to the commissioning, the appliance or the inclusion key may receive an indication that the appliance has been commissioned in the network using the data identifying the application configuration (460). The appliance may deliver an application program interface to the network controller. The application program interface may facilitate the exchange of data between the controller and the appliance. A user may remove the network inclusion key device from the appliance data receptacle and insert it back into a data receptacle of the network controller. A subsequent removal of the network inclusion key device from the network controller data receptacle may be detected by the network controller. The network controller may be configured to respond to the detected removal of the removable device by decommissioning the appliance from the network. Alternatively, a user may provide an input to the network controller to indicate that a device is to be decommissioned.

Figure 5:
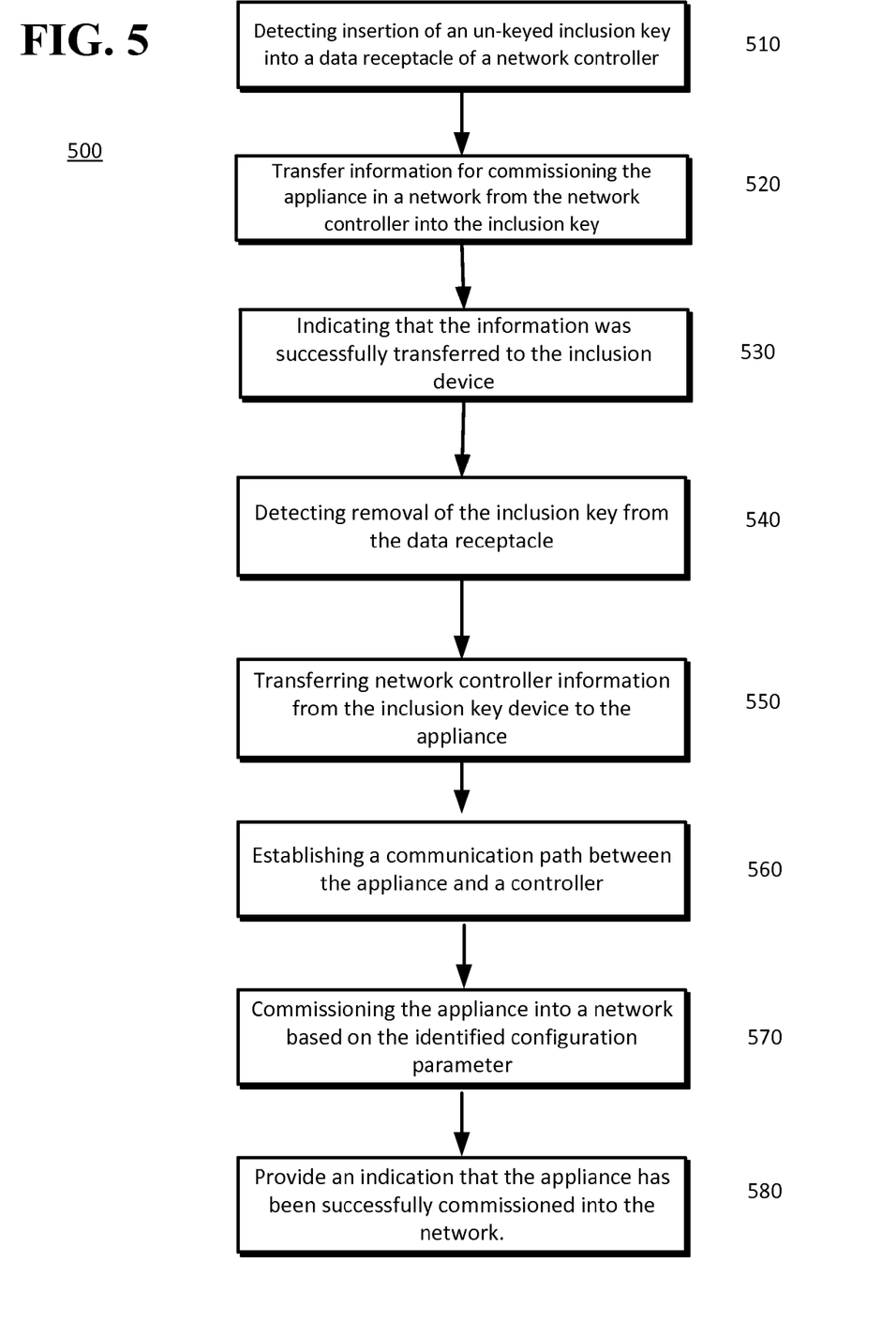
FIG. 5 shows a flowchart according to an implementation of the disclosed subject matter.

FIG. 5 shows a flow chart of an implementation of the disclosed subject matter. Inclusion key devices may also be provided that do not contain any data related to either a specific appliance or a specific home network. These inclusion key devices may be "un-keyed' devices. A process 500 may use the un-keyed inclusion keys for exchanging information useful for commissioning the appliance into the network. A processor in a network controller may detect the insertion of the un-keyed inclusion device (510) and determine that the inclusion device is un-keyed. The un-keyed inclusion device may be unrelated to any known network or any device presently commissioned in the network. The network controller may transfer information for commissioning an appliance into the network to the un-keyed inclusion device (520). The transferred information may include network configuration parameters, such as a network name, network passwords, a network encryption key(s), an IP address for the appliance, and other information that may be used to commission the appliance into the network. Upon transferring the information to the inclusion key device, an indication of the successful transfer may be output (530). The output may be, for example, a visual output, such as an indicator light, or an audio output, such as a beeping noise. The inclusion key may be removed from the network controller, which may be detected by the network controller (540). The inclusion key may be inserted into a data receptacle of the appliance to be commissioned in the network. The network controller information may be transferred from the inclusion key to the appliance (550). Using the information transferred from the inclusion key, an appliance processor may establish a communication path with the network controller (560). The appliance processor and network controller may exchange signals that may include additional configuration information related to the appliance, the network or both. The appliance may be commissioned into the network based on the information, for example, a configuration parameter, on the inclusion key device (570). Configuration parameters may include at least one of a network type, a network implementation type, a network name, a network password, a media access control address, an internet protocol (IP) address, a configuration program universal resource locator, and an encryption setting. An indication may be provided that the appliance has been successfully commissioned into the network (580).

The above described implementations may be used in combination with one another depending upon the home network, the appliance manufacturer, the level of security desired by a user for a particular appliance and the like.

The inclusion key may take a number of different forms. It may be configured to use data receptacles that meet, for example, the standards for universal serial bus (USB-plug A or B), secure digital (SD, miniSD, microSD cards), subscriber identity module (SIM) card or a bank chip card. The inclusion key may include an indicator that may produce a visible or audible indication that the appliance has been commissioned into the network, or that data has been transferred.

The inclusion key may include communication electronics in addition to data relevant to commissioning an appliance in the network. The communications electronics may include an RF transceiver, such as Bluetooth, Zigbee, Z-wave, X-10, Wi-Fi and/or cellular, a wired communications, such as Ethernet, a power line modem, optical communications or the like. For example, the inclusion key may be inserted in a device receptacle of either a home network controller or an inclusion key docking station. After completion of the commissioning process, the inclusion key may be used by which ever device it is connected to communicate with the respective appliance or network controller according to its communication protocol. The inclusion key may also be inserted into a data receptacle of a communication key docking station that includes several USB, mini-USB, Ethernet or other jacks that allow for several inclusion keys to be connected at one time to a network controller.

Specific examples of the above described implementations include the installation of a newly-purchased washing machine. The new washing machine may be equipped with communication capabilities. Since a washing machine is often a basement appliance wireless communications may be problematic, so the washing machine may be equipped with power line communications. As in the prior television examples, the inclusion key device may be included with the washing machine. The user may remove the inclusion key, and plug it into a data receptacle of the network controller. In this case, the inclusion key may not only be an interface for direct provision of information to the home automation network controller. The inclusion key may also contain a powerline modulator/demodulator configured to communicate with the new washing machine. For example, the inclusion key device may plug into the network controller as a USB device, but also have a second plug that connects to a safe PLC coupling built into the home automation/network device. Alternatively, the network controller may include a power line modem. Once plugged into the network controller, communication may be established between the home controller and the washing machine to allow for commissioning of the washing machine in to the network.

As mentioned above, the inclusion key may include additional information such as data related to data encryption and authentication. The inclusion key device may further specify an encryption technique, e.g. CBC, an initialization vector for the encryption, and Java code (or a custom interface in the inclusion key device to include additional data into the configuration parameters whenever the configuration data is transferred either into or out of the inclusion key device, such as rolling key, and the like. This data, for example, may be used for an authentication handshake with the appliance or network.

Alternatively, a smart phone may act as an additional security or information interface between the appliance and network controller to broker the commissioning process. For example, the smart phone may provide additional information or allow the setting of user preferences. This may be accomplished, for example, using NFC or QR code provisioning with a smartphone application. In addition, light pulses (using a smart phone video camera) or audio (recorded with a smart phone microphone) may also be used to convey information related to the appliance to the smart phone for commissioning the appliance into the network. Furthermore, a smart phone enabled with near field communication (NFC) or Bluetooth capability may be used in place of the inclusion device. For example, an appliance may be shipped with an NFC transceiver or tag that may include the appliance-related information described above. Similarly, the network controller may include an NFC tag or transceiver that may be read by or may receive data from the NFC-enabled smart phone. Processes similar to those described with respect to FIGS. 2-5 may be performed to commission the appliance into the network.

Figure 6:
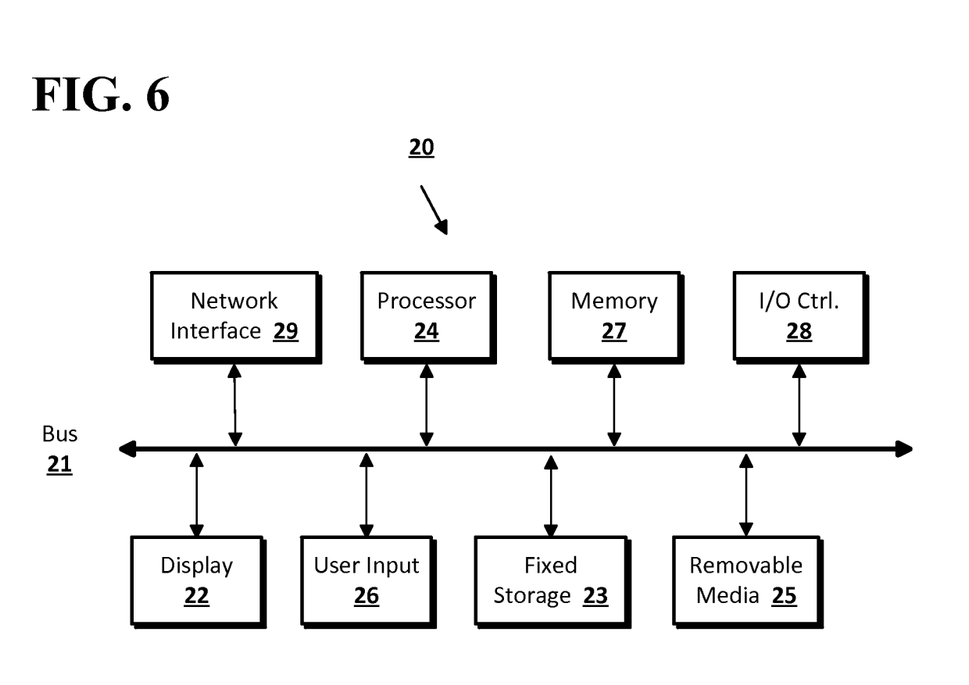
FIG. 6 shows a computer according to an implementation of the disclosed subject matter.

Implementations of the presently disclosed subject matter may be implemented in and used with a variety of component and network architectures. For example, the home controller or the appliance may include all or a subset of the components illustrated in FIG. 6. FIG. 6 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via known techniques. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 1.

Many other devices or components (not shown) may be connected in a similar manner (e.g., document scanners, digital cameras and so on). Conversely, all of the components shown in FIG. 6 need not be present to practice the present disclosure. The components can be interconnected in different ways from that shown. The operation of a computer such as that shown in FIG. 6 is readily known in the art and is not discussed in detail in this application. Code to implement the present disclosure can be stored in computer-readable storage media such as one or more of the memory 27, fixed storage 23, removable media 25, or on a remote storage location.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over a transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In certain configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description and following appendices, for purpose of explanation, have been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method comprising:
   detecting, by a controller processor, insertion of a removable device into a data receptacle of a controller;
   retrieving information specific to an appliance from a data storage of the removable device;
   identifying a configuration parameter for the appliance using the information received from the removable device;
   determining that the appliance has not previously been commissioned in a network according to the identified configuration parameter;
   commissioning the appliance into the network based on the identified configuration parameter; and
   establishing a communication path with the appliance to provide network settings to the appliance for the network.

2. The method of claim 1, further comprising:
   accessing an application program interface for the appliance from the removable device, wherein the application program interface facilitates the exchange of data between the controller and the appliance.

3. The method of claim 1, wherein the configuration parameter is selected from at least one of the appliance identification number, a network type, a network implementation, settings for the appliance, a device IP address, and a communication protocol of the appliance.

4. The method of claim 1, further comprising:
detecting removal of the removable device from the controller data receptacle.

5. The method of claim 1, further comprising:
determining that the removable device has been inserted into a data receptacle in the appliance; and
exchanging additional data with the appliance via the communication path.

6. The method of claim 1, further comprises:
exchanging information with the appliance through a power line modem.

7. The method of claim 1, further comprises:
exchanging information with the appliance through a wired network connection.

8. The method of claim 1, further comprises:
exchanging information with the appliance through a wireless transceiver.

9. The method of claim 8, wherein the wireless transceiver operates in the frequency range of 802.11 devices.

10. A system comprising:
an inclusion key docking station having a plurality of receptacles for accepting inclusion keys;
a network connection;
a Wi-Fi transceiver; and
a network controller processor configured to:
read information from a removable inclusion key, wherein the information is specific to an appliance;
identify a configuration parameter of an appliance to be commissioned in a network controlled by the system;
determine that the appliance has not previously been commissioned in the network according to the identified configuration parameter;
commission the appliance into the network based on the identified information; and
establish a communication path between the appliance and the network controller to provide network settings for the network to the appliance.

11. The system of claim 10, further comprising:
a power line modem communicatively coupled to the processor, wherein a power line accessible by the network is used to establish the communication path to the appliance.

12. The system of claim 10, wherein the network controller processor is further configured to access an application program interface for the appliance from the removable inclusion key, wherein the application program interface facilitates the exchange of data between the network controller processor and the appliance.

13. The system of claim 10, wherein the information read from the removable inclusion key by the network controller processor is selected from at least one from the group consisting of: an appliance identification number, a network type, a network implementation, settings for the appliance, an IP address, and a communication protocol of the appliance.

14. The system of claim 10, wherein the network controller processor is further configured to detect removal of the removable inclusion key from the inclusion key docking station.

15. The system of claim 10, wherein the network controller processor is further configured to determine that the removable inclusion key has been inserted into one of the plurality of receptacles of the inclusion key docking station, and to exchange additional data with the appliance via the communications path.

16. A method, comprising:
detecting insertion of an inclusion device into an appliance data receptacle, the inclusion device containing pre-installed information related to a network;
retrieving the pre-installed information from the inclusion device;
determining that the appliance has not previously been commissioned in a network according to the pre-installed information;
establishing a communication path between the appliance and a network controller using the pre-installed information;
transmitting data identifying the appliance configuration to the network controller; and
receiving an indication the appliance has been commissioned in the network using the data identifying the application configuration.

17. The method of claim 16, further comprising:
receiving application program interface data for providing appliance state information to the network controller.

18. The method of claim 16, wherein the pre-installed information includes at least one of a network type, a network implementation type, a network name, a network password, a media access control address, an internet protocol (IP) address, a configuration program universal resource locator, and an encryption setting for the appliance.

19. The method of claim 16, wherein the appliance delivers an application program interface to the network controller.

20. The method of claim 16, further comprising:
identifying the appliance as a universal appliance based on the pre-installed information, wherein the pre-installed information includes an encryption key that allows a universal communication channel to be established between the appliance, the network and a remote control device.

21. The method of claim 20, wherein the universal communication channel is a secure channel accessible by a remote control device.

22. The method of claim 21, wherein the remote control device is at least one of a smart phone, remote garage door opener, a remote keypad, a laptop, and a gaming device.

23. The method of claim 16, further comprising:
receiving configuration parameters from the network controller.

24. The method of claim 23, wherein the configuration parameters received from the network controller include at least one of network type, a network implementation type, a network name, a network password, a media access control address, an internet protocol (IP) address, a configuration program universal resource locator, and an encryption setting for the network controller.

25. A method, comprising:
inserting an appliance-related inclusion device into a data receptacle coupled to a network controller, wherein the appliance-related inclusion device is provided by an appliance manufacturer;
determining that the appliance has not previously been commissioned in a network according to network configuration information stored on the appliance-related inclusion device;
transferring from the inclusion device the network configuration information for an appliance to be commissioned into the network;
commissioning the appliance into the network using the configuration parameters; and
indicating via a user interface that the appliance has been successfully configured into the network.

26. The method of claim 25, wherein the configuration parameters include at least one of a network type, a network implementation type, a network name, a network password, a media access control address, an internet protocol (IP) address, a configuration program universal resource locator, and an encryption setting.

27. The method of claim 25, further comprising:
removing an appliance-related inclusion device from the data receptacle; and
inserting the appliance-related inclusion device into an appliance data receptacle.

28. The method of claim 25, further comprising:
accessing an application program interface for the appliance from the appliance-related inclusion device, wherein the application program interface facilitates the exchange of data between the network controller and the appliance.

29. The method of claim 25, further comprising:
detecting removal of the appliance-related inclusion device from the data receptacle.

30. The method of claim 25, further comprising:
determining that the appliance-related inclusion device has been inserted into the data receptacle; and
exchanging additional data with the appliance via a communications path.

31. A method, comprising:
detecting insertion of an un-keyed inclusion device into a network controller of a network, wherein the un-keyed inclusion device is unrelated to any network or any device presently commissioned in the network;
transferring to the inclusion device network configuration parameters reserved for an appliance to be commissioned in the network; and
indicating via a user interface that the reserved configuration parameters have been successfully transferred to the inclusion device memory.

32. The method of claim 31, wherein the reserved configuration parameters include at least one of a network type, a network implementation type, a network name, a network password, a media access control address, an internet protocol (IP) address, a configuration program universal resource locator, and an encryption setting.

33. The method of claim 31, further comprising:
removing the un-keyed inclusion device from the network controller; and
inserting the un-keyed inclusion device into an appliance data receptacle.

34. The method of claim 31, further comprising:
establishing a communication path between the appliance and the network controller.

35. The method of claim 34, wherein the communication path is an electrical power line coupled to the appliance.

36. The method of claim 34, wherein the communication path is a radio frequency link between the appliance and the controller device.

37. The method of claim 31, further comprising:
accessing an application program interface for the appliance from the un-keyed inclusion device, wherein the application program interface facilitates the exchange of data between the network controller and the appliance.

38. The method of claim 31, further comprising:
detecting removal of the un-keyed inclusion device from the network controller.

39. The method of claim 31, further comprising:
determining that the un-keyed inclusion device has been inserted into the network controller; and
exchanging additional data with the appliance via the communication path.

* * * * *